(12) United States Patent
Höppner et al.

(10) Patent No.: US 11,163,352 B2
(45) Date of Patent: Nov. 2, 2021

(54) MULTICORE PROCESSOR AND METHOD FOR DYNAMICALLY ADJUSTING A SUPPLY VOLTAGE AND A CLOCK SPEED

(71) Applicant: TU DRESDEN, Dresden (DE)

(72) Inventors: Sebastian Höppner, Dresden (DE); Bernhard Vogginer, Dresden (DE); Yexin Yan, Dresden (DE); Christian Mayr, Dresden (DE)

(73) Assignee: Technische Universität Dresden, Dresden (DE)

( * ) Notice: Subject to any disclaimer, the term of this patent is extended or adjusted under 35 U.S.C. 154(b) by 35 days.

(21) Appl. No.: 16/616,594

(22) PCT Filed: May 18, 2018

(86) PCT No.: PCT/DE2018/100484
§ 371 (c)(1),
(2) Date: Nov. 25, 2019

(87) PCT Pub. No.: WO2018/215023
PCT Pub. Date: Nov. 29, 2018

(65) Prior Publication Data
US 2021/0124407 A1    Apr. 29, 2021

(30) Foreign Application Priority Data

May 24, 2017    (DE) ..................... 10 2017 111 350.9

(51) Int. Cl.
*G06F 1/00*      (2006.01)
*G06F 1/324*    (2019.01)
(Continued)

(52) U.S. Cl.
CPC ................ *G06F 1/324* (2013.01); *G06F 1/08* (2013.01); *G06F 1/3228* (2013.01); *G06F 1/3296* (2013.01)

(58) Field of Classification Search
None
See application file for complete search history.

(56) References Cited

U.S. PATENT DOCUMENTS

| 7,685,446 B2 | 3/2010 | Hong et al. |
| 8,639,862 B2 | 1/2014 | Bouvier et al. |

(Continued)

FOREIGN PATENT DOCUMENTS

| DE | 10 2005 047 619 A1 | 4/2007 |
| DE | 10 2009 019 824 A1 | 11/2009 |

OTHER PUBLICATIONS

International Search Report issued by the European Patent Office in International Application PCT/DE2018/100484.

(Continued)

*Primary Examiner* — Nitin C Patel
(74) *Attorney, Agent, or Firm* — Ursula B. Day, Esq.

(57) ABSTRACT

The invention relates to a multicore processor and a method for dynamically adjusting a supply voltage and a clock frequency, with which an individual supply voltage and dock frequency adjustment, which depends on a current computing load, is facilitated for each processor core of a multicore processor. Thus, an assembly is disclosed where a local queue memory unit which is connected to the processor core, the internal memory unit, and the level converter is arranged in a voltage-variable region of the processor element in order to store events to be processed by the processor core. The invention is also directed to a method in that the required supply voltage U and the required clock frequency f are adjusted for each cycle in a controlled manner by the processor core of the respective processor element depending on the detection of a number of events to be processed which are stored in an internal queue memory unit.

10 Claims, 6 Drawing Sheets (51) Int. Cl.
*G06F 1/08* (2006.01)
*G06F 1/3228* (2019.01)
*G06F 1/3296* (2019.01)

(56) References Cited

U.S. PATENT DOCUMENTS

| | | | |
|---|---|---|---|
| 8,671,413 B2 | 3/2014 | Garash et al. | |
| 2007/0113113 A1* | 5/2007 | Sauer | G06F 1/324 |
| | | | 713/322 |
| 2007/0234091 A1* | 10/2007 | Vishin | G06F 1/3203 |
| | | | 713/322 |
| 2009/0327656 A1* | 12/2009 | Baum | G06F 1/206 |
| | | | 712/43 |
| 2018/0181183 A1* | 6/2018 | Yoon | G06F 1/329 |

OTHER PUBLICATIONS

S. Höppner, C. Shao, H. Eisenreich, G. Ellguth, M. Ander, R. Schüffner: A Power Management Architecture for Fast Per-Core DVFS in Heterogenous MPSoCs, IEEE International Symposium on Circuits and Systems, 2012, pp. 261-264.

E. Painkras, L. A. Piana, J. Garside, S. Temple, F. Galluppi, C. Patterson, D. R. Lester, A. D. Brown, S. B. Furber: "Spinnaker: A 1-w 18-core system-on-chip for massively-parallel neural network simulation", IEEE Journal of Solid-State Circuits, vol. 48, No. 8, 2013, pp. 1943-1953.

\* cited by examiner

Fig. 1

Prior Art

MULTICORE PROCESSOR AND METHOD FOR DYNAMICALLY ADJUSTING A SUPPLY VOLTAGE AND A CLOCK SPEED

CROSS-REFERENCES TO RELATED APPLICATIONS

This application is the U.S. National Stage of International Application No. PCT/DE2018/100484, which designated the United States and has been published as International Publication No, WO 2018/215023 A1 and which claims the priority of German Patent Application, Serial No. DE 10 2017 111 350.9, filed May 24, 2017, pursuant to 35 U.S.C. 119(a)-(d) the description of which is hereby incorporated by reference.

BACKGROUND OF THE INVENTION

The invention relates to a multicore processor having a plurality of processor elements for dynamically adjusting a supply voltage and a clock frequency, wherein at least one processor core, an internal memory, a switching network and a level shifter is arranged in a voltage-variable region in each processor element.

The invention also relates to a method for dynamically adjusting a supply voltage and a clock frequency, wherein in a multicore processor having a plurality of processor elements a required supply voltage U and a required clock frequency f is adjusted for each processor element for each cycle during which a number of events are processed by a processor core of the processor element.

So-called event-based simulations are known, for example for computer applications in the field of so-called neuromorphic computer systems, which simulate spiking neural networks. Technical applications involving event-based simulations include for example image processing, audio and video processing, mobile robotics (e.g. navigation), or classification of data. For such simulations, suitable program-controlled processors are used to process the data.

As in many other fields of technology, it is also desirable to reduce the power dissipation for these applications in such simulations and to thereby maximize, for example, the data throughput and computational capacity of these systems considering the available resources. Resources limiting the system may be, for example, a power supply with limited efficiency of the power supply unit or a limited battery life. Limitations may also be caused by a cooling system having a limited passive or active cooling capacity.

A multicore processor used, for example, for event-based simulations usually includes a number of processor elements, each having a processor core, wherein these processor elements are interconnected. Such a connection can be made for example via a connection network such as a bus system or a network-on-chip.

Alternatively, so-called multiprocessor systems can be used, wherein the multicore processors associated with a multiprocessor system have at least two processor elements with respective processor cores for processing data.

It is known in the art that energy savings can be achieved in such systems by, for example, so-called dynamic scaling of a supply voltage and a clock frequency of one or more processor cores. This dynamic scaling is also referred to as "Dynamic Voltage and Frequency Scaling" and abbreviated DVFS.

With such dynamic scaling, the supply voltage and/or clock frequency of at least one processor core is increased in the event that more computing power is requested. This operating mode requires a substantial amount of energy per task or cycle.

In the event that the request for the computing power drops or is low, the supply voltage and/or the clock frequency of a processor core is reduced. In this mode, less energy is required per task or cycle.

Typically, for the purpose of dynamic scaling, pairs or value pairs consisting of a specific supply voltage or a supply voltage level and an associated dock frequency are formed, which are also referred to as performance level PL.

The required computing power per processor core can vary, for example, depending on an input signal of an event-based simulation where, for example, input signals of the neural network or video data are to be processed, and can therefore generally not be predicted. The input signals of the neural network or the video data represent in such a simulation the events to be processed by one or more processor cores.

Since the requirements of one or more processor cores cannot be predicted for such input signals, it is also not possible to use prior-art approaches where a central controller such as a central power management controller or a task scheduler determines the supply voltage and/or the clock frequency of the processor cores.

There is thus a need to make an individual decision for each processor core regarding the supply voltage at which it operates. There is also a need to make an individual decision for each processor core regarding the clock frequency at which it should operate. Both decisions depend on the current number of events to be processed, i.e. on the respective load of a processor core.

In multicore processors, a certain number n of different supply voltages are provided in a so-called supply voltage network. Thus, several supply voltages with different levels, such as $U_1=0.7$ volts, $U_2=0.85$ volts or $U_3=1.0$ volts are available for each processor element and thus for each processor core.

A supply voltage, at which a processor core is to be currently operated, can be assigned to each processor core from these provided supply voltages. Such a selection or assignment of a supply voltage to a specific core is described, for example, in S. Höppner, C. Shao, H. Eisenreich, G. Eliguth, M. Ander, R. Schüffny, A. Power Management Architecture for Fast Per-Core DVFS in Heterogeneous MPSoCs, IEEE International Symposium on Circuits and Systems, 2012, p. 261-264.

However, when allocating a supply voltage in this way, it should be taken into account that the supply voltage lines for the multicore processor are subject to a limitation on their maximum allowable current. The cause of this limitation is the maximum output current of the voltage regulator and an IR drop on the supply voltage lines on the chip itself. IR drop refers here to the unwanted, static and/or dynamic reduction of the local supply voltage at the logic cells of the digital circuit, caused by the voltage drop across the ohmic resistances of the supply voltage network digital circuit, wherein this voltage drop is caused by the current flow itself.

Thus, for example, it must be ensured by a suitable control method that the supply voltage lines are not overloaded by the individual connections of individual processor cores with the available supply voltages $U_1$ or $U_2$ or $U_3$. The three supply voltages listed here are to be understood as an example and not as a limitation of the number of supply voltages.

According to the state of the art, systems with multicore processors or multiprocessor systems for event-based simulations have hitherto been implemented without power management. An example of one such system is disclosed in E. Painkras, L. A. Plana. J. Garside, S. Temple, F. Galluppi, C. Patterson, D. R. Lester, A. D. Brown, and S. B. Furber, "Spinnaker. A 1-w 18-core system-on-chip for massively-parallel neural network simulation", IEEE Journal of Solid-State Circuits, vol. 48, no. 8, pp. 1943-1953, August 2013.

According to the state of the art, multicore processors for mobile radio applications have, for example, a central control unit, such as a core manager or a task scheduler, wherein this central control unit can distribute tasks to different processor cores, which are also referred to as processing elements. For this purpose, however, the necessary computational load and execution times must be known in advance in order to set the performance level PL, i.e. the supply voltage and/or the frequency for a computing core, in this context, methods, for example, for a performance estimation based on the algorithm or source code are known from U.S. Pat. No. 7,685,444 B2 and U.S. Pat. No. 8,671,413 B2.

The term "computing load" or "processor load" refers to the processes currently running on a computer system or waiting for specific events, i.e. generally the current utilization of, for example, a multicore processor.

Also known are methods wherein a central event queue is used in the system-on-chip for determining the voltage levels and/or frequency levels of individual processor cores. U.S. Pat. No. 8,639,862 B2 describes an example of such a solution with the title "System-on-chip queue status power management".

From DE 10 2009 019 824 A1, a method is known wherein the processor load is determined based on a number of events that occur in a time interval and wherein a corresponding supply voltage and a clock frequency are adjusted. This adjustment is made by a central controller.

It is also known from the prior art that processors can change the supply voltage based on their current computational load by reprogramming external voltage regulators.

The power supply lines of multicore processors are typically sized for a maximum current per line, which occurs when all processor elements are connected with their processor cores to one of these lines.

The disadvantages of this known state of the art are that, in the absence of a dynamic scaling of the supply voltage and the clock frequency of one or more processor cores, high power dissipation occurs when the connected network or the performed simulation has low activity.

When centrally scaling or adjusting the supply voltage and the clock frequency of one or more processor cores dynamically, the processes and the computational load of individual processor cores must be known.

In event-based simulations, however, these processes or the computational load depend significantly on dynamically changing activities of the network and its input signals during operation. Thus, it is not possible to determine these in advance.

SUMMARY OF THE INVENTION

The object of the invention is therefore to provide a multicore processor and a method for dynamically adjusting a supply voltage and a clock frequency, which allow determining for each processor core of a multicore processor a supply voltage and a clock frequency individually depending on a current computing load.

In addition, none of the supply voltage lines for providing different supply voltages for the processor cores of a multicore processor should be overloaded.

This object and others are attained according to the invention, each processor core has a local clock generator. In addition, a switching network for connecting the processor core to one of a plurality of available supply voltage lines is provided, on which a voltage supply unit provides, for example, the voltages $U_1=0.7$ volt, $U_2=0.85$ volt and $U_3=1.0$ volt.

It is also provided that each processor core has a power management controller (PMC), also referred to as an internal supply voltage frequency control arrangement. This internal supply voltage frequency control arrangement controls the switching network and the clock generator in the processor element and thus provides for the associated processor element the currently required supply voltage $U_1$, or $U_2$, or $U_3$ and the currently required clock frequency $f_1$ or $f_2$ or $f_3$ depending on a currently determined computing load. In this way, each processor core can be individually adapted to current requirements, i.e. to a changing number of events to be processed in a specific cycle or time window.

It is provided that the internal supply voltage frequency control arrangement is controlled via a control signal and thus sets the switching network and the clock generator in the processor element accordingly. This control signal is generated by its own processor core and transmitted to the internal supply voltage frequency control arrangement. Alternatively, the internal supply voltage frequency control arrangement may also be controlled by a control signal generated external to the processor element, which is transmitted to the internal supply voltage frequency control arrangement for example via a corresponding bus system such as a network-on-chip. The performance level, i.e. the supply voltage level and the clock frequency for the processor core are thus set by the control signal.

This control signal may be generated with its own processor core by writing, for example, events received via a network-on-chip to a local queue memory. Based on the fill level of the local queue memory, i.e. the number of events to be processed, the current workload is determined at fixed times. In general, a small number of received events to be processed represent a low computational load on the processor core, whereas a very large number of events to be processed represent a high computational load. This is especially true because the processing of the events usually has to be performed within a predetermined time window, i.e. in one cycle, in order to allow real-time processing of the events.

The local queue memory may be a memory arranged in the processor element and connected to the processor core, the internal memory of the processor element and a level shifter.

The local queue memory may also be realized in software using the data memory of the processor core. Furthermore, the local queue memory may be realized in a hardware module which uses either the data memory of the processor or a separate memory. This hardware module is, for example, a so-called external supply voltage frequency control arrangement which is connected to the processor core via the network-on-chip bus system.

The current computational load may be determined at fixed times based on the level of the local queue memory. For generating these times regularly, a timer may be realized by processing software. Alternatively, these times may be generated with a timer implemented in hardware. These times may also be generated with a global timer, which may also be implemented in hardware and which is connected with the processor core and the internal supply voltage frequency control arrangement via the bus system network-on-chip for transmitting the times.

Switching of the supply voltage level and the clock frequency for the processor core based on a calculated computing load, i.e. based on the level of the local queue memory, may also be implemented by using a table (lookup table) in which so-called limit or threshold values for the fill level of the local queue memory for switching to a specific supply voltage or a specific clock frequency are stored. Such a table can be realized in software, for example stored in the processor element, or also by using a separate hardware module. In these cases, the determined fill level F of the local queue memory is an input variable for the table from which the supply voltage U and the clock frequency f for the processor core can be read out as output variable.

Alternatively, switching of the supply voltage and the clock frequency for the processor core may be implemented by using a formula for calculating the supply voltage and the clock frequency on the basis of the current fill level F of the local queue memory. Such a formula can be implemented, for example, in software in the processor element or in a separate hardware module.

In one example of such a formula, three performance levels PL1, PL2 and PL3 may be provided, which represent three different combinations of a respective supply voltage U and a respective clock frequency f. For example, a supply voltage $U_1$ and a clock frequency $f_1$ for the processor core are set with the performance level PL1, allowing a small number of events with a tow fill level F of the local queue memory to be processed.

With the performance level PL2, for example, a supply voltage $U_2$ and a clock frequency $f_2$ are set for the processor core, thus allowing an average number of events with an average fill level F of the local queue memory to be processed.

With the performance level PL3, for example, a supply voltage $U_3$ and a clock frequency $f_3$ are set for the processor core, thus allowing a large number of events with a high fill level F of the local queue memory to be processed.

In one embodiment, a supply voltage $U_1$ of 0.7 volts at a clock frequency $f_1$ of 125 MHz, may be specified for the performance level PL1, a supply voltage $U_2$ of 0.85 volts at a clock frequency $f_2$ of 333 MHz may be specified for the performance level PL2, and a supply voltage $U_3$ of 1.0 volts at a clock frequency $f_3$ of 500 MHz may be specified for the performance level PL3.

In general the following applies: $U_1<U_2<U_3$ and $f_1<f_2<f_3$.

For determining the supply voltage U and the clock frequency f for the processor core, the following formula is stored:

$$PL=PL1, \text{if } F<F_{th1}$$

$$PL=PL2, \text{if } F_{th1} \leq F<F_{th2}$$

$$PL=PL3, \text{if } F_{th2} \leq F,$$

Wherein $F_{th1}$ is a first threshold and $F_{th2}$ is a second threshold and the first threshold $F_{th1}$ is less than the second threshold $F_{th2}$.

Since the current computing load is determined based on the fill level of the local queue memory at fixed times for a so-called cycle having a certain length, the performance level PL is also switched at these fixed times. Switching the performance level PL at these times may, for example, be switching from $PL_1$ to $PL_2$ if the fill level F of the queue memory has increased in the current cycle compared to the previous cycle. Switching of the performance level PL at these times may, for example, be switching from $PL_3$ to $PL_2$ if the fill level F of the queue memory has decreased in the current cycle compared to the previous cycle, if the fill level F of the queue memory in the current cycle has not changed at all or has not changed significantly compared to the previous cycle, the performance level PL, which was $PL_2$ for example, retains the same value and is thus again $PL_2$.

The fill level F as well as the first threshold value $F_{th1}$ and the second threshold value $F_{th2}$ can be expressed, for example, as a percentage. For example, a level F of 100 percent would correspond, for example, to the maximum number of events to be processed in a cycle. For example, the first threshold value $F_{th1}$ may be set at 25 or 33 percent and the second threshold value $F_{th2}$ at 66 or 75 percent, with a person skilled in the art making an appropriate allocation of the threshold values $F_{th1}$ and $F_{th2}$ adapted to current requirements.

The current performance level may also be reset, for example, after a complete execution of the number of events to be processed. While switching or, in a special case, maintaining a set performance level takes place in a first implementation always at the fixed times at the end of the cycle, in this alternative embodiment, switching to a lower performance level takes place already after the events are processed in the processor core and before the fixed time at the end of the cycle has been reached. This premature downshifting of the performance level, i.e. adjusting a lower supply voltage U and/or a lower clock frequency f for the processor core, leads to additional energy savings and reduces the generation of heat in the processor core. This premature downshifting of the performance level may include one or more performance levels PL. The switchover can thus be a downshift to the next lower performance level, for example from $PL_3$ to $PL_2$, or to the performance level following the next lower performance level, for example from $PL_3$ to $PL_1$.

According to another embodiment of the invention, the connection of each processor core to one of the supply voltages $U_1$ or $U_2$ or $U_3$ may be controlled by a central supply voltage network controller to prevent overloading one of the voltage supply lines supplying the voltages $U_1$, $U_2$ and $U_3$ or overloading a unit generating the voltage. For this purpose, this central supply voltage network controller is connected via a bus system, such as a network-on-chip, to the processor cores and hence to the processors and the internal supply voltage frequency control arrangements in the processor cores.

This central supply voltage network control manages the resources of the supply voltage network and limits the maximum possible number of processors that can be additionally connected via the switching network to one of the supply voltage lines, i.e. to one of the voltages $U_1$, $U_2$ and $U_3$.

This limitation can be performed by the supply voltage network controller, for example by a request from a processor core to the supply voltage network control by way of a token. If the switchover currently requested by the processor to a certain supply voltage line is confirmed by the supply voltage network controller, then the switching network of the processor core switches the supply voltage of this processor to the requested supply voltage under control of the processor.

If the switchover currently requested by the processor to a certain supply voltage line is not released by the supply voltage network control, since the maximum number of connections to this supply voltage line has already been made by other processor cores, then the supply voltage of this processor core is no switched by the switching network, in this case, the processor may place a new request to the supply voltage network controller and, for example, requesting a switchover to another supply voltage line having a lower supply voltage. Granting such authorizations is known in the art and will therefore not be described in more detail.

The central supply voltage network control may also generate a control signal for the internal supply voltage frequency control arrangement which is transmitted via the bus system and controls the internal supply voltage frequency control arrangement, thereby selecting a supply voltage and a frequency. A requested and approved performance level can therefore be selected without the processor.

The central supply voltage network control can be implemented both in a software solution and in a hardware solution.

Thus, the invention implements a local determination of the voltage level and frequency level of a processor core, based on the fill level of a queue memory, at defined time intervals determined by a timer for each cycle.

The own supply voltage and dock frequency of a processor core can be autonomously switched, with a central supply voltage network control monitoring the available resources.

BRIEF DESCRIPTION OF THE DRAWINGS

The foregoing features and advantages of this invention can be better understood and appreciated after a thorough study of the following detailed description of the preferred non-limiting exemplary embodiments of the invention herein, together with the accompanying drawings, which show in FIG. 1: a block diagram of a processor with several processor elements, FIG. 2 a block diagram of a processor element with a dynamic adjustment of a supply voltage and a dock frequency, FIG. 3 a timing diagram of a flow of an event-based simulation with a dynamic adjustment of a supply voltage and a clock frequency in a first embodiment, FIG. 4 a timing diagram of a flow of an event-based simulation with a dynamic adjustment of a supply voltage and a clock frequency in a second embodiment, FIG. 5 a diagram of a dynamic adjustment of a supply voltage and a clock frequency depending on currently arriving events in a simulation, and FIG. 6 a diagram of three histograms with the respective number of required cycles per performance level.

DETAILED DESCRIPTION OF PREFERRED EMBODIMENTS

Figure 1:
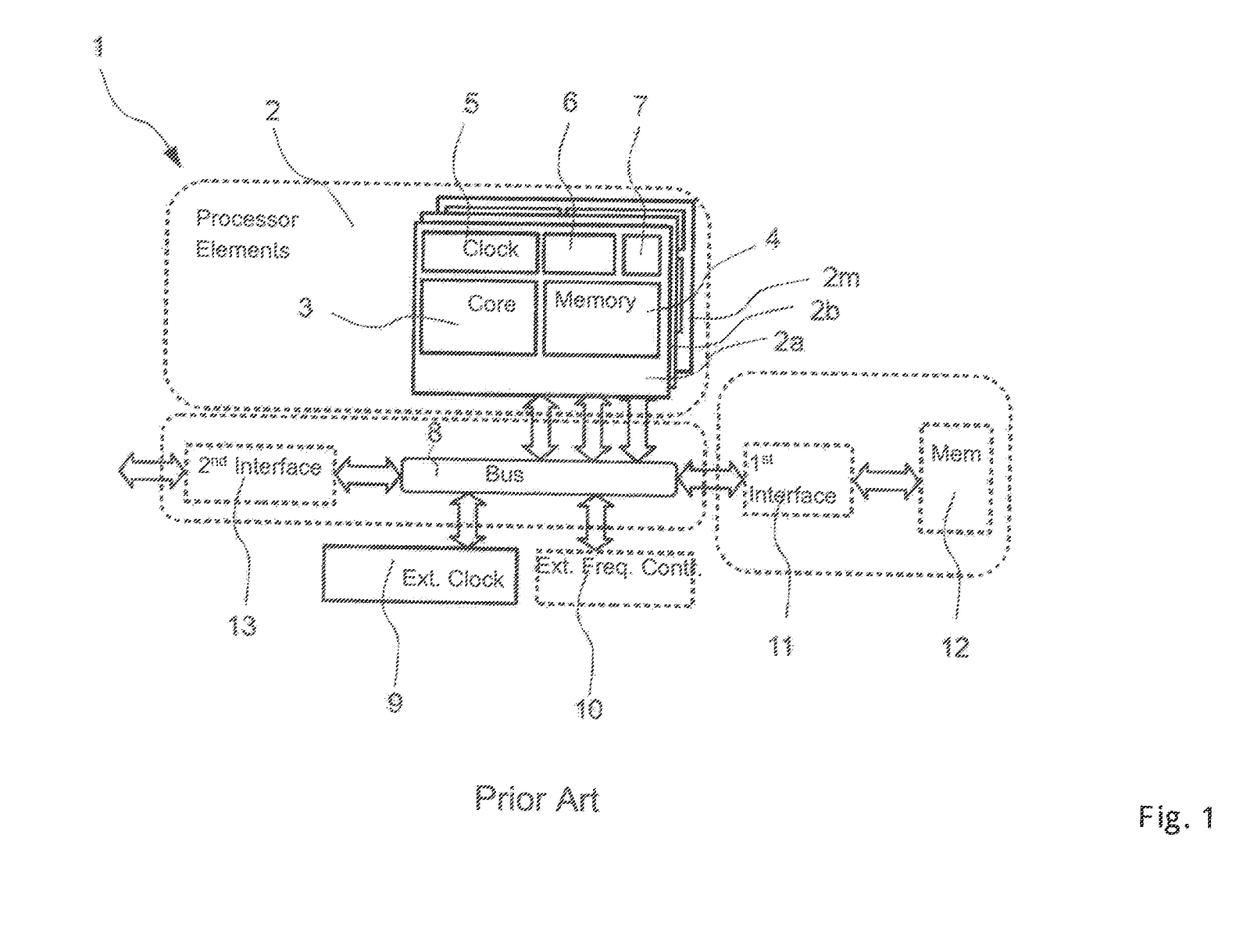

FIG. 1 shows a block diagram of a prior art multicore processor 1, which has a number m of processor elements 2. Each of these processor elements 2 includes a processor core 3, an electronic memory 4, which may be for example a so-called SRAM (static random access memory), a local clock generator 5, an Internal supply voltage frequency control arrangement 6 and a switching network 7. In the example of FIG. 1, the processor elements 2a, 2b to 2m are shown, which have an identical structure.

The m processor elements 2a, 2b, . . . , 2m can be connected via a bus system 8, which can also be implemented as a network-on-chip, for the transmission of data with each other and with external units.

The bus system 8 may be connected, for example, to an external clock generator 9. Furthermore, an external supply voltage frequency control arrangement 10, a first interface 11 for connection to an external memory 12 or a second interface 13, for example, for connection to an external router, may be arranged on this bus system 8.

Figure 2:
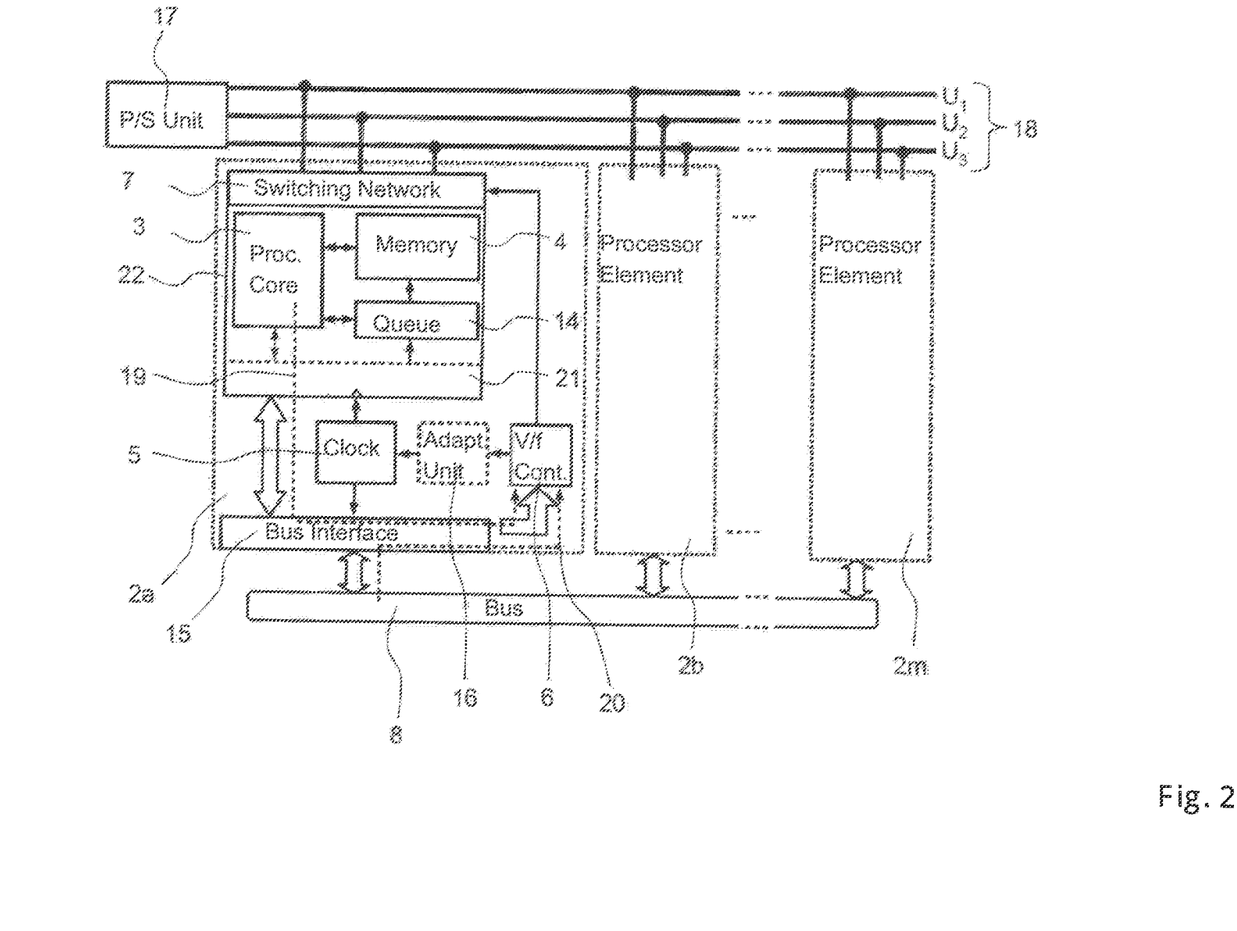

FIG. 2 shows a block diagram of a processor element 2a with a dynamic adjustment of a supply voltage and a clock frequency according to the invention. Each processor element 2a, 2b, . . . , 2m includes a processor core 3, an electronic memory 4, a local clock generator 5, an internal supply voltage frequency control device 6 and a switching network 7.

To implement the invention, each processor element 2 has a local queue memory 14 storing the events 24 to be processed by the processor core 3, which occur, for example, within an event-based simulation. This local queue memory 14 is implemented in the example as a hardware solution and connected to the processor core 3, the internal memory 4 and a level shifter 22 via corresponding data lines or bus lines.

As shown in FIG. 2, a respective bus interface 15 is provided for coupling the processor elements 2 to the bus system 8.

The internal supply voltage frequency control arrangement 6 is connected with its control lines to the internal clock generator 5 and the switching network 7. The internal supply voltage frequency control arrangement 6 controls with suitable control signals via the switching network 7 a connection of a currently required supply voltage $U_1$ or $U_2$ or $U_3$ to the processor core 3 and via the internal clock generator 5 the generation of a clock frequency $f_1$ or $f_2$ or $f_3$ required in the current cycle. An adaptation unit 16, such as a lookup table, may optionally be arranged between the internal supply voltage frequency control arrangement 6 and the internal clock generator 5. With such an adaptation unit 16, the control signal output from the internal supply voltage frequency control arrangement 6 for selecting a frequency f to be currently adjusted can be adapted to the format or signal required by the internal clock generator 5 for providing the desired frequency f.

The supply voltages $U_1$, $U_2$ and $U_3$ are provided by a power supply unit 17. FIG. 2 shows three different exemplary voltages $U_1$, $U_2$ and $U_3$. A limitation to just three possible voltages is not contemplated. The voltage supply fines, which form a supply voltage network 18, are connected to the inputs of the switching networks 7 of the processor elements 2a, 2b, . . . , 2m. Hereby, one of the provided supply voltages $U_1$ or $U_2$ or $U_3$ may be connected by the switching networks 7 to the respective processor element 2a, 2b, . . . , 2m or the respective processor core 3 with the control signal of the internal supply voltage frequency control arrangement 6.

Connecting a supply voltage $U_1$ or $U_2$ or $U_3$ to the respective processor core 3 also includes connecting this supply voltage to a so-called voltage-variable region 22 of the processor element 2. In addition to the processor core 3, this voltage-variable region 22 also includes the internal memory 4 connected to the processor core 3 and the local queue memory 14, i.e. all assemblies which are contained in the box represented by a continuous line under the switching network 7.

A level converter 21 is provided to adapt a signal level between the modules in the voltage-variable region 22, which can be operated with one of the three provided voltages $U_1$, or $U_2$ or $U_3$, and the assemblies arranged outside the voltage-variable region 22 in the processor element 2 and operated with a constant supply voltage. This level converter 21, also referred to as a level shifter, ensures, for example, in the schematic diagram of FIG. 2 that the levels between the voltage variable range 22 and the internal clock generator 5 and the voltage-variable range 22 and the bus interface 15 are matched.

For adjusting a required supply voltage for the modules in the voltage-variable range 22 and a required clock frequency for the processor core 3, the fill level of the local queue memory 14, i.e. the number of events to be processed 24 and thus the current computational load, is determined under control of the processor 3 at fixed times. Depending on the fill level F of the local queue memory 14, the processor 3 determines, for example by using a stored formula or by a comparison with stored threshold values, a performance level to be set for the subsequent processing cycle of the events 24, such as the required supply voltage U and the required frequency f. This information determined by the processor 3 about the required performance level is transmitted via the first transmission path 19 to the internal supply voltage frequency control arrangement 6, which controls the setting of the switching network 7 for selecting a supply voltage $U_1$ or $U_2$ or $U_3$ and of the frequency generator 5 for generating the frequency $f_1$ or $f_2$ or $f_3$ for the next cycle.

In an alternative embodiment, the supply voltage frequency control arrangement 6 may be controlled via a second transmission path 20 via the bus interface 15 and the bus system 8 from outside the processor element 2. This variant of an external controller is provided in the event that the fill level F of the local queue memory 14 is checked at Fixed times by an external supply voltage frequency control arrangement 10, which is not shown in FIG. 2. The connection of the external supply voltage frequency control arrangement 10 to the bus system 8 is illustrated in FIG. 1. This alternative embodiment enables a form of control of the supply voltage and the frequency for the processor 3 known from the prior art.

Figure 3:
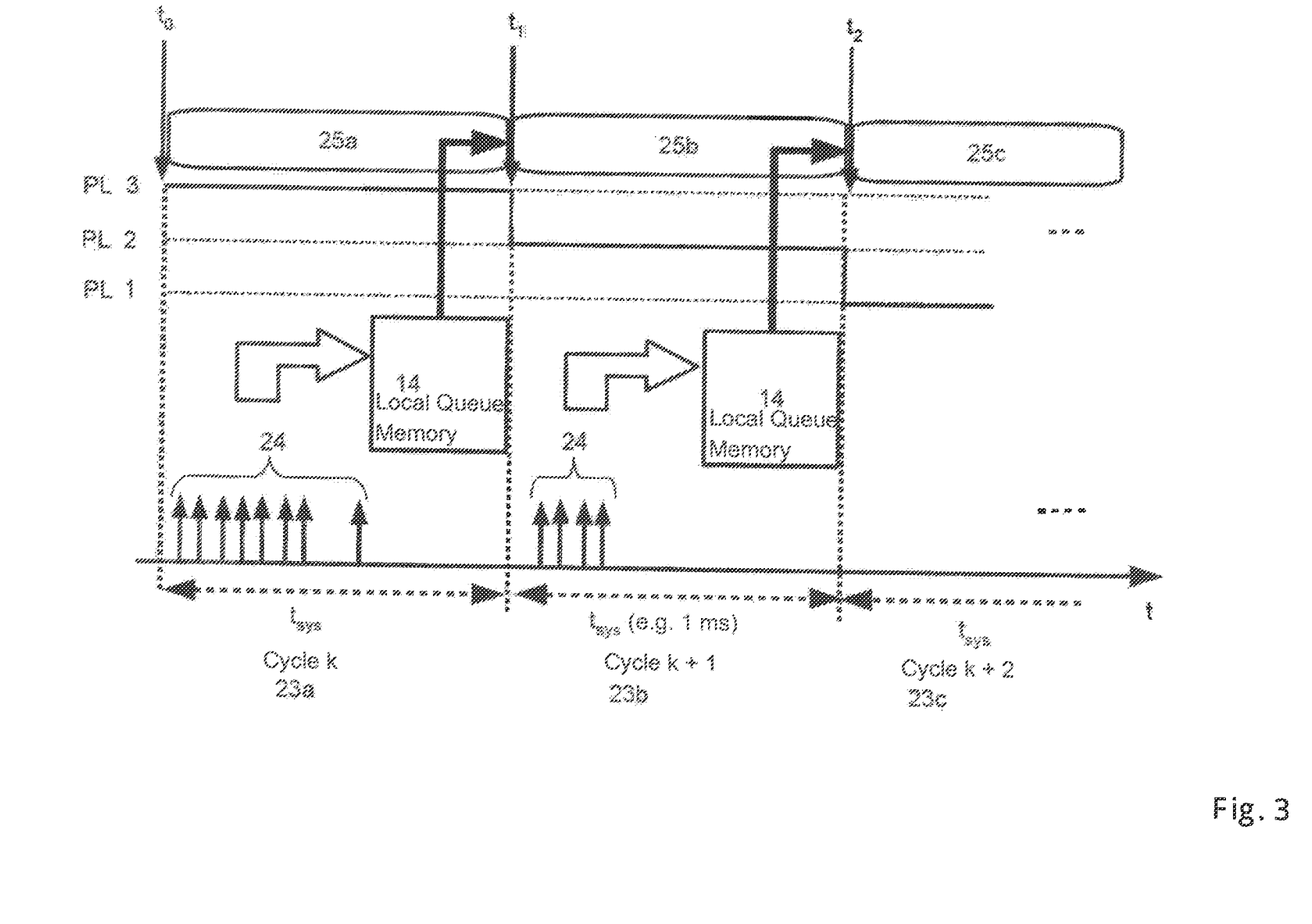

FIG. 3 shows a time diagram of a sequence of an event-based simulation with a dynamic adjustment of a supply voltage and a clock frequency in a first embodiment.

Several consecutive cycles 23 are shown on the abscissa as a function of time, with a current number of events 24 is to be processed by the processor core 3 of a processor element 2 during each cycle. The first cycle 23a is labeled cycle k, the second cycle 23b is labeled cycle k+1, and the third cycle 23c is labeled cycle k+2. The cycles 23 have identical duration, which is indicated in the example of FIG. 3 with $t_{sys}$=1 ms.

At the start of the processing of events 24, for example in an event-based simulation, for example the highest performance level PL3 is set at time t=0. The highest supply voltage $U_3$ and the highest clock frequency $f_3$ that can be generated by the internal clock 5 is assigned to this performance level PL3. Thus, a very large number of events 24 can be processed in the first cycle 23a.

During the processing 25a of the events 24 (not shown in FIG. 3) in the first cycle 23a, the local queue memory 14 is filled with the eight events 24 to be processed, for example, in the subsequent second cycle 23b. The processor core 3 checks the fill level F of the local queue memory 14 at a fixed point in time $t_1$ and determines, depending on this current fill level F, the performance level PL required for the subsequent second cycle 23b. In the example, for the subsequent second cycle 23b, the performance level PL2 was determined by the processor core 3, which is then set at the time $t_1$ by the internal supply voltage frequency control arrangement 6. Thus, for example, the voltage $U_2$ was selected as the supply voltage, and the clock frequency $f_2$ as an intermediate frequency f to be generated by the internal clock generator 5, since the number of eight events 24 to be processed and the computational load is less than in the first cycle 23a.

In the second cycle 23b, the eight events 24 are processed at the set performance level PL2, while at the same time the local queue memory 14 is filled with the four events 24 to be processed in the subsequent third cycle 23c. In the example, the performance level PL1 at the time $t_2$ is now determined by the processor core 3 for the subsequent third cycle 23c, which is set at the time $t_2$ by the Internal supply voltage-frequency control arrangement 6. This performance level PL1, which is assigned the smallest supply voltage $U_1$ and the smallest dock frequency $f_1$ that can be generated by the internal clock generator 5, is sufficient for processing the number of four events 24 to be processed in the third cycle 23c, which represents a further reduction from the preceding second cycle 23b.

In this described process flow, the method continues in the third cycle and subsequent cycles 23, which are not shown in FIG. 3.

Figure 4:
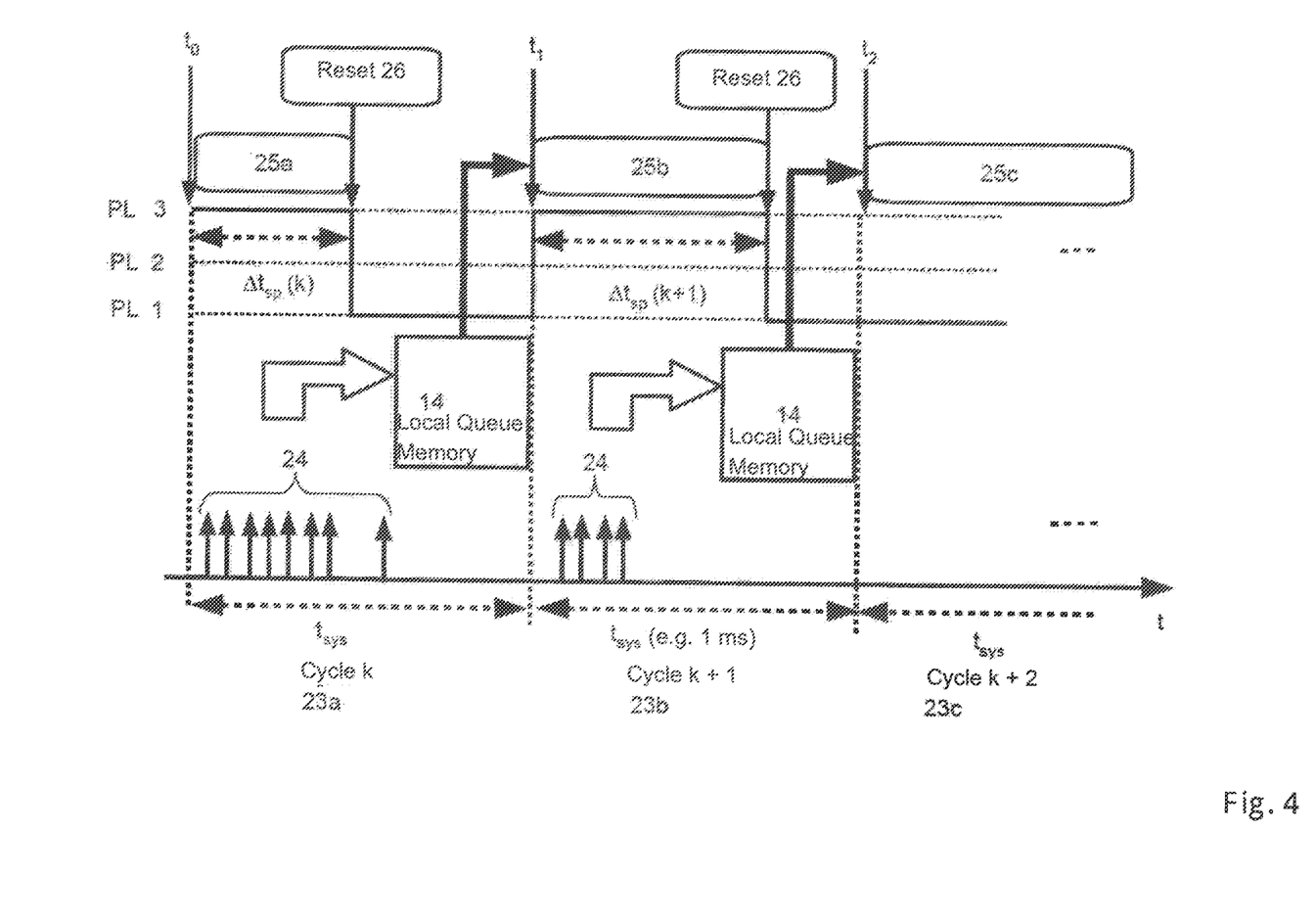

FIG. 4 shows a time diagram of a sequence of an event-based simulation with a dynamic adjustment of a supply voltage and a clock frequency in a second embodiment.

The sequence of the dynamic adjustment of a supply voltage and a clock frequency essentially corresponds to the explanations provided in reference to FIG. 3, to which reference is made. The difference of the embodiment in FIG. 4 is that processing of the events 24 in each cycle 23 is checked within the time of the processing 25a, 25b, 25c, . . . etc. depending on whether the last event 24 to be processed was processed by the processor core 3. After the last event 24 has been executed or processed, for example, the current performance level is switched to the lowest performance level, for example PL1. In a special case where the processor element 2 or the processor 3 is already operated at the lowest performance level PL1, the lowest performance level PL1 remains set.

In the example of FIG. 4, the performance level PL3 is set at the time $t_0$ at the beginning of the processing of the events 24. When the last event 24 to be processed is processed in the processing 25a, the processing 25a is terminated and the performance level PL3 set at the time $t_0$ is reset 26. Advantageously, the reset 26 is performed by setting the lowest or smallest performance level, in the example PL1. By resetting the performance level for the time remaining in the current cycle 23a, a further saving of energy and a further reduction in the heat development of the processor cores 3 is achieved.

At the time $t_1$ the performance level determined by the processor core 3 based on the level of the local queue 14, in this example the performance level PL3, is set according to the method already described above. Subsequently, the processing 25b of the events 24 to be processed in the second cycle 23b begins in the usual way. After the processing of the last event 24, the processing 25b is terminated and the currently set performance level PL3 is again reset 26 to the performance level PL1, in which the processor element 2 or the processor 3 remains until the end of the second cycle 23b, when at time $t_2$ a currently determined performance level is again set. The performance level PL3 set at time $t_0$ is maintained in the first cycle 23a for a duration of $\Delta t_{SP}$ (k). The performance level PL3 set at time $t_1$ is maintained in the second cycle 23b for a duration of $\Delta t_{SP}$ (k+1), as shown in FIG. 4.

Figure 5:
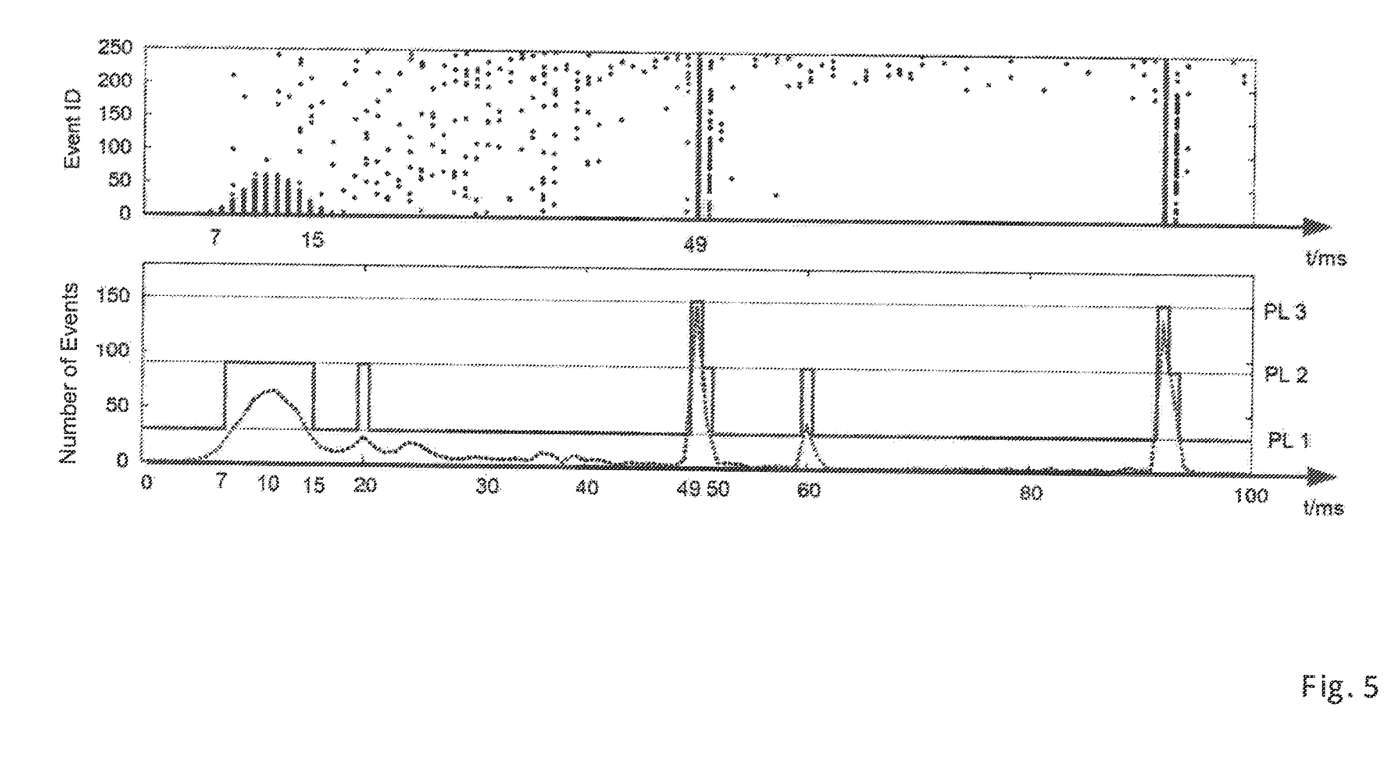

FIG. 5 shows a diagram of a dynamic adjustment of a supply voltage and a clock frequency as a function of currently received events 24 in an example simulation.

FIG. 5 shows, in an upper diagram, a course of the occurrence of events 24 to be processed in an event-based simulation as a function of time. The upper area of FIG. 5 shows a course the occurrence of events 24 provided with an identification number ID as a function of time. For example, it can be seen that certain events 24 occur more frequently in a region of approximately 7 ms to 15 ms. A particularly pronounced occurrence of events 24 can be observed In a region of approximately 49 ms to 50 ms. At this time almost ail possible 250 events occur simultaneously.

The number of received events 24 is shown in the lower part of FIG. 5 by a dot-dot line. The solid line represents the currently set performance level PL for a processor element 2 which can be switched between the performance levels PL1, PL2 and PL3. The performance levels PL are selected and switched according to a method already described with reference to FIG. 3 or FIG. 4.

As is evident, the current performance leveling PL is based on the number of events 24 to be processed. Thus, when a large number of approximately 150 events 24 to be processed by the processor core 3, for example in a region of approximately 49 ms to 50 ms, the performance level is switched to performance level PL3, whereas for an average number of approximately 65 events 24 to be processed, for example in the region of approximately 7 ms to 15 ms, the performance level PL2 is sufficient to safely process ail pending events 24 within the time available in one cycle 23. This secure processing of the events 24 within a cycle 23 ensures real-time processing of the events 24 occurring in a simulation.

Figure 6:
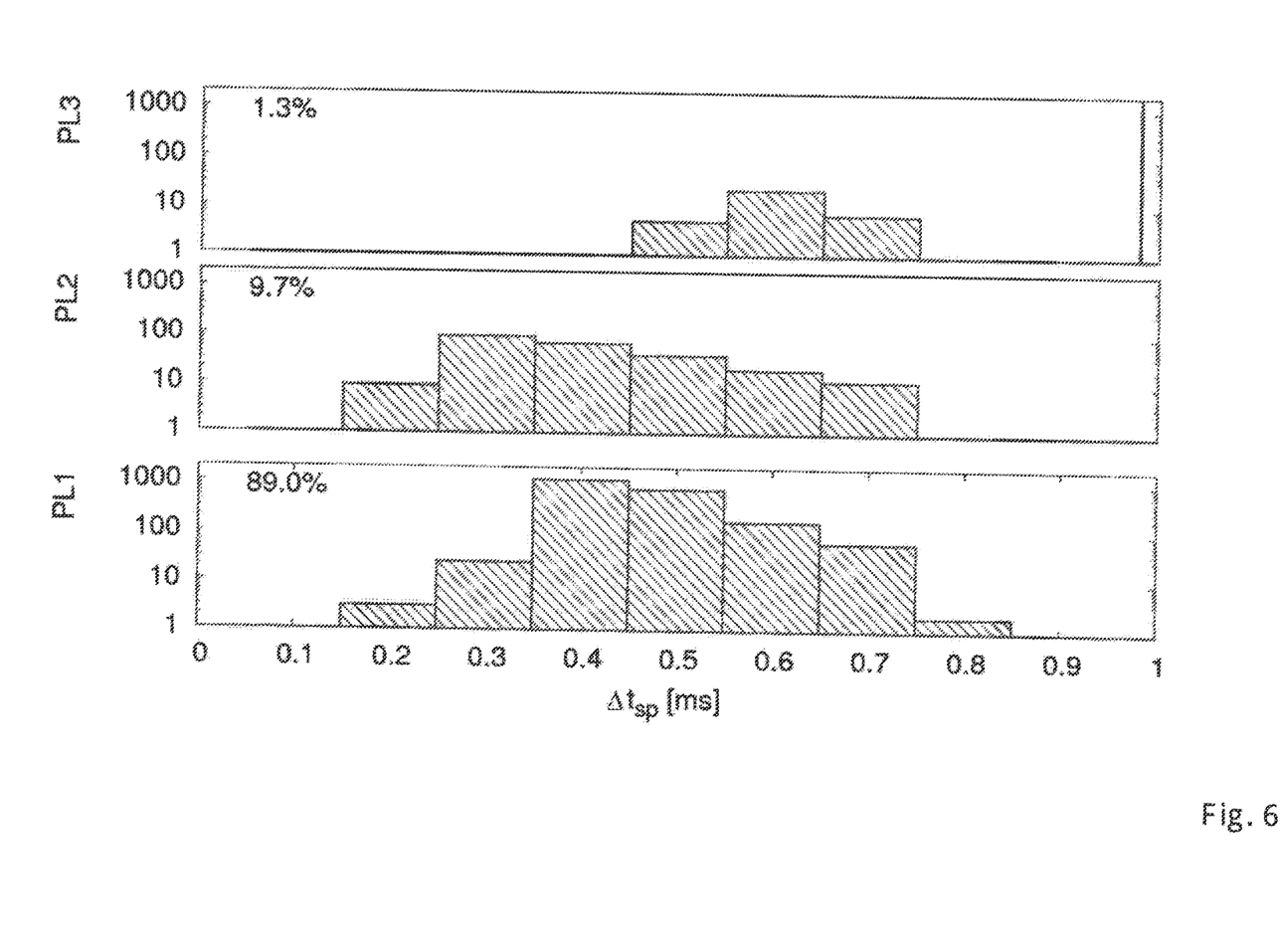

FIG. 6 shows a diagram of three histograms with the respective number of required cycles per performance level PL. In the lowermost representation of FIG. 6, it can be seen that, in an executed and analyzed event-based simulation, 89.0 percent of all cycles 23 were processed with a set performance level PL1. The most frequently occurring duration $\Delta t_{SP}$ required to process ail events 24 occurring within a cycle 23 is 0.4 ms.

As can be seen in the middle illustration of FIG. 6, 9.7 percent of ail cycles 23 were executed in this event-based simulation at a set performance level PL2. The most frequent duration $\Delta t_{SP}$ required to process all occurring events 24 within a cycle 23 is 0.3 ms at the performance level PL2.

As can be seen in the uppermost representation of FIG. 6, 1.3 percent of all cycles 23 at a performance level PL2 were processed in this event-based simulation. The most frequent duration $\Delta t_{SP}$ required to process all occurring events 24 within one cycle 23 is 0.6 ms at the performance level PL3.

A possible exemplary application of an event-based simulation described here may be an application with a camera and an evaluation of the current camera image. For this purpose, the detection area of the camera may be subdivided into a several subareas, with each of these subareas being assigned to a processor element 2 or a processor core 3 for processing the events 24 occurring in the respective subarea. If, for example, a multicore processor 1 with four processor elements 2 is available, then a division into four subareas can take place. For a multicore processor 1 with eight processor elements 2, a division into eight subareas can take place, etc.

Since the occurrence of events 24, which may include a change of a parameter such as an illuminance of a pixel of the camera, is unpredictable in the various subareas and can have different intensity, the presented method for dynamic adjustment of a supply voltage and a clock frequency, i.e. a performance levels PL, by the respective processor core 3 of the respective processor element 2 depending on the number of 24 events to be processed is employed for individual control of each processor element 2.

Although this specification describes event-based simulations as examples, the application of the invention is not limited to this form alone.

In general, the method can be applied when the computational load of a processor element 2 cannot be globally predicted, but rather results dynamically based on input data during operation of the system. These input data do not necessarily have to represent time-dependent events. For example, the method may conceivably also be used for classifying large quantities of data (databases), wherein the event then designates, for example, the occurrence of a special pattern in the data sets to be processed, which may lead to additional computing steps.

The method can be also applied, for example, to classifying image data using deep learning methods, i.e. the use of neural networks, in this case, the event represents the transmission of a weighted synaptic signal from one neuron layer of the network to another, without explicitly requiring any temporal reference.

In typical applications of the invention in multiprocessor systems in modern CMOS technologies, such as 28 nm CMOS or 22 nm CMOS, supply voltage values are typically in a range from 0.40V to 1.00V and clock frequencies of the processor are in a range from 50 MHz to 2 GHz.

Some of the particular advantages of dynamically adjusting a supply voltage and a clock frequency are listed below:

Executing processing of events in the event-based simulation in the processor element such as a processor core with minimal required supply voltage and/or clock frequency. This achieves a significant reduction in power loss.

Application for event-based simulations where the computational load of individual processor cores is unpredictable, as it depends on the input signals (events).

Preventing overloading the supply voltage networks during operation of the system.

What is claimed is:

1. A multicore processor comprising, a plurality of processor elements, where at least one processor core, an internal memory, a switching network and a level shifter for dynamically adjusting a supply voltage and a clock frequency are arranged in a voltage-variable region in one of the processor elements, wherein a local queue memory is arranged in the voltage variable region of the processor element, and connected with the processor core, the internal memory and the level shifter for storing processes to be processed by the processor core, wherein a fill level F is determined from the number of events to be processed that are stored in the internal queue memory, and a first threshold value $F_{th1}$ and a second threshold value $F_{th2}$ are determined, with $F_{th1} < F_{th2}$, that when $F < F_{th1}$, the supply voltage $U_1$ and the clock frequency $f_1$ are set for the subsequent cycle, that when $F_{th1} < F < F_{th2}$, the supply voltage $U_2$ and the clock frequency $f_2$ are set for the subsequent cycle and that when $F_{th2} \leq F$, the supply voltage $U_3$ and the clock frequency $f_3$ are set for the subsequent cycle, wherein $U_1 < U_2 < U_3$ and $f_1 < f_2 < f_3$.

2. The multicore processor according to claim 1, wherein an internal supply voltage frequency control arrangement controlled by an associated processor core is arranged in each processor element.

3. The multicore processor according to claim 2, wherein the internal supply voltage frequency control arrangement is connected to the switching network and to an internal clock generator.

4. The multicore processor according to claim 3, wherein an adaptation unit is arranged between the internal supply voltage frequency control arrangement and the internal dock generator.

5. A method for dynamically adjusting a supply voltage and a clock frequency in a multicore processor having a plurality of processor elements, comprising,
selecting a required supply voltage U for a processor element from a number of provided supply voltages $U_1$, $U_2$, ... $U_x$, and selecting a required clock frequency f from a number of provided clock frequencies $f_1$, $f_2$ ... $f_y$ for a processing cycle of a number of events by a processor core,
adjusting the required supply voltage U and the required clock frequency f for each cycle controlled by the processor core of the respective processor element in dependence on a determination of a number of events to be processed that are stored in an internal queue memory,
wherein a fill level F is determined from the number of events to be processed that are stored in the internal queue memory, and a first threshold value $F_{th1}$ and a second threshold value $F_{th2}$ are determined, with $F_{th1}<F_{th2}$, that when $F<F_{th1}$, the supply voltage $U_1$ and the clock frequency $f_1$ are set for the subsequent cycle, that when $F_{th1}<F<F_{th2}$, the supply voltage $U_2$ and the clock frequency $f_2$ are set for the subsequent cycle and that when $F_{th2} \leq F$, the supply voltage $U_3$ and the clock frequency $f_3$ are set for the subsequent cycle, wherein $U_1<U_2<U_3$ and $f_1<f_2<f_3$.

6. The method according to claim 5, wherein the number of events to be processed that are stored in the internal queue memory is determined once per cycle at a predetermined time t.

7. The method according to claim 6, wherein the required supply voltage U and the required clock frequency f for a chronologically subsequent cycle are adjusted once per cycle at the specified time t.

8. The method according to claim 7, wherein the supply voltage U and the clock frequency f are determined by a table from the number of events to be processed that are stored in the internal queue memory.

9. The method according to claim 7, wherein the supply voltage U and the clock frequency f are determined with a formula or threshold values of the number of events to be processed that are stored in the internal queue memory.

10. The method according to claim 9, wherein the supply voltage U set at time t and the clock frequency f are reset after processing of the events to be processed by the processor core in the current cycle, with the reset occurring to a smaller or to the smallest provided supply voltage $U_1$ and the smallest provided frequency $f_1$.

* * * * *